March 8, 1938.　　R. W. MITCHELL　　2,110,632
WELDING MACHINE
Filed Aug. 17, 1935　　7 Sheets-Sheet 1

FIG. 1.

INVENTOR
R. W. MITCHELL
ATTORNEY

FIG. 2.

March 8, 1938.　　　R. W. MITCHELL　　　2,110,632
WELDING MACHINE
Filed Aug. 17, 1935　　　7 Sheets-Sheet 3

INVENTOR
R.W. MITCHELL
BY

ATTORNEY

March 8, 1938.     R. W. MITCHELL     2,110,632
WELDING MACHINE
Filed Aug. 17, 1935     7 Sheets—Sheet 4

INVENTOR
R.W. MITCHELL
BY
ATTORNEY

Patented Mar. 8, 1938

2,110,632

UNITED STATES PATENT OFFICE 2,110,632

WELDING MACHINE

Robert W. Mitchell, Westmount, Quebec, Canada

Application August 17, 1935, Serial No. 36,738

23 Claims. (Cl. 219—8)

This invention relates broadly to improvements in the art of welding and relates more particularly to welding machines especially adapted for the manufacture of tubular objects, such as pipes, barrels, tanks and the like. The following description and the accompanying drawings disclose the invention as embodied in or applied to an electric arc welding machine, but it will be understood the invention is not thus limited.

The general object of the invention is to provide a simple, inexpensive, durable and efficient welding machine capable of making a plurality of different forms of welds, namely, straight welds and welds curved in different planes.

A further object is to provide means for minutely, accurately and independently regulating the rate of electrode feed and the lineal speed of welding through considerable ranges.

A still further object is to provide automatic means independent of the feeding mechanism for moving the electrode to predetermined proper distance from the work after each approach to the work to strike an arc.

Another object is to provide means for maintaining ground resistance uniform during progress of the welding.

Still another object is to provide improved means for holding work and for moving the work as necessary according to the form of weld to be made.

Various other objects and the advantages of the invention may be ascertained from the following description and the accompanying drawings.

Broadly speaking, the invention resides in the provision of a central electrode carrying means for moving an electrode from one to another of a plurality of welding positions and for feeding the electrode, and a plurality of work holders located about said central means to hold the work suitably for effecting different forms of welds, certain of said holders being adapted to move the work as necessary to produce the desired form of weld. The central electrode carrying means comprises a bed upon which an electrode carriage is slidably mounted and moved by mechanism including selective and variable speed changing devices, whereby the carriage may be moved with reference to the work, the carriage being also rotatable with reference to the bed, thereby to move the electrode into operative relation with work on the several holders selectively. The carriage supports electrode feeding means including selective and variable speed changing devices and reversing means. One of the work holders is adapted to hold work stationary for straight line welding and other holders are adapted to rotate work about horizontal and vertical axes, respectively, for curved line welding.

In greater detail, the invention resides in the features and combinations of features disclosed in the following description and/or the accompanying drawings, together with all substitutions of equivalents and all such modifications as lie within the scope of the appended claims.

In the accompanying drawings illustrative of one embodiment of the invention but to which embodiment the invention is not confined, as other embodiments are possible, also modifications of detail;—

Referring more particularly to the drawings, A designates a base upon which certain main mechanisms of the machine are mounted, these mechanisms being, a central electrode carrying and moving device designated as a whole by the letter B, and a stationary work holder C. Rotating work holders D and E adapted to rotate the work about horizontal and vertical axes, respectively, are arranged adjacent the base A.

The base also carries the main driving motor 11, a variable speed changing device 12 with controls 13, 14 and 15 extending to locations convenient to the work holders C, D and E, respectively, and a selective speed changing device 16. Power is transmitted from the speed change device 16 to the mechanisms B, D and E, selectively, through any suitable means. One such transmitting means comprises a speed reduction chain gearing 17 between the device 16 and a counter shaft 18, on which three pinions 19, 20 and 21, pertaining to the mechanism B, D and E, respectively are freely revoluble. A clutch 22, splined to the counter shaft and controlled by the levers 23, 23a and 23b, affords driving connection between the shaft and the pinion 19. A second clutch 24 controlled by the levers 25 and 25a, affords selective connection between the pinions 20 and 21 and the counter shaft.

*The central electrode carrying device "B"*

Figures 4, 6, 9:
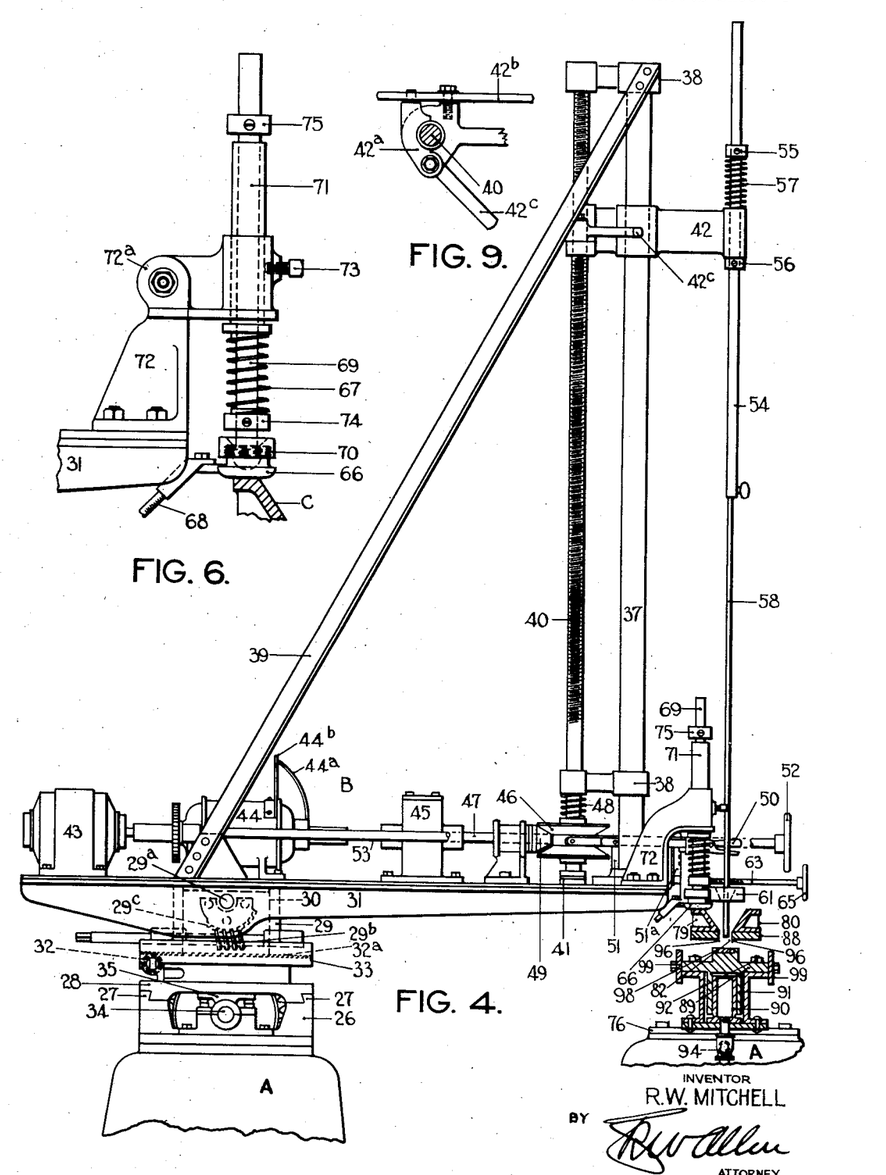
Fig. 4 is an end elevation of the carriage on an enlarged scale as compared with Figure 1 and shows the work holder of Fig. 3 in cross-section on the line 4—4 of Fig. 3.
Fig. 6 is an elevation of the ground contact means.
Fig. 9 is a plan view of the quick release driving nut of the electrode carrier.

The central electrode carrying device comprises essentially a bed upon which is slidably mounted a swinging or rotatable carriage supporting an electrode feeding means. The bed, designated 26, is fixed to the base A and is formed with guides or rails 27 slidably supporting a turret base 28, upon which a turret 29 is rotatably mounted by means of a stud or king pin 30 fixed preferably to the turret base 28, and entering the turret. A table 31 is mounted near one of its ends on the turret and may be swung through 360° by reason of the rotatable mounting of the turret. The table may be rotated about the turret axis and secured in any desired angular relation to the bed by any suitable means, such as a worm 32 mounted on one of the contacting bearing flanges 33 of the turret base and turret and engaging a circular rack 32a provided on the other of said flanges. The table may be fixed with relation to the turret or may be tiltably mounted by means of axially horizontal studs 29a, and may be rotated about the axis of the studs and secured at any desired inclination by means of a worm 29b mounted in the turret engaging a toothed quadrant 29c on the table (Figure 4).

A worm shaft 34 is rotatably mounted in the bed and held against longitudinal movement. The turret base carries any suitable form of nut 35 operatively engaging the worm shaft so the rotation of the shaft will move the carriage along the bed. The worm shaft is driven in any suitable way from the pinion 19, for example, by a speed reduction chain gearing 36.

The table carries electrode feeding means of any suitable sort. For light high speed welding where the electrode used is a wire of comparatively small diameter, the feeding means may be of any well known or other suitable continuous type and the electrode may be supplied from a reel mounted on the table. For the heavy welding within the capacity of the machine herein described, where the electrode is of comparatively large diameter, it is preferred to use electrode rods of suitable length clamped in a movable holder and to feed the electrode to the work by moving the holder. Mechanism for accomplishing this is illustrated and will be described now.

A column 37 is fixed to that end of the table 31 most remote from the bed and carries upper and lower brackets 38 fixed thereto. The column is steadied by braces 39 extending from the upper bracket to the table near the end remote from the column and fixed to the upper bracket and table. A worm shaft 40 is rotatably mounted in the brackets 38 and in a foot bearing 41 on the table. An electrode carrier 42 is slidably mounted on the column and operatively engages the worm shaft 40 by means of a quick release nut 42a, whereby upon rotation of the shaft the carrier will be raised or lowered on the column according to the direction of shaft rotation. The nut 42a is a half nut pivoted to the carrier 42 and held in mesh with the screw by a latch 42b (Fig. 9) and operated by a handle 42c. A driving motor 43 for the worm shaft is mounted on the table 31 and driving connection between the motor and shaft includes a variable speed device 44, a speed reducer 45, a spool type reversing clutch 46 and the connecting shafts 47. The spool of the clutch is splined to the shaft and a spring 48 arranged in compression between the spool and the lower bracket 38 urges the upper flange toward the driving element 49 interposed between the spool flanges, the upper flange being that which rotates the worm shaft 40 in a direction to cause descent of the carrier 42. A reversing lever 50 is pivoted to a bracket 51 fixed to the table 31 and interlocks with a notched bracket 51a fixed to the table to hold the clutch in neutral or reverse position. A controlling and adjusting wheel 52 for the variable speed device 44 is located near the reverse lever and connected to the variable speed device by a shaft 53. An indicator 44a mounted on the device 44 and swinging over a stationary scale 44b shows the speed ratio at which the device is set or the feeding speed of the electrode or other information for the guidance of the operator.

A tubular electrode holder 54 of insulating material is slidably mounted in the carrier. Adjustable collars 55 and 56 are clamped on the holder above and below the carrier and a helical spring 57 is mounted on the holder in compression between the upper collar and the upper surface of the carrier, the strength of the spring being sufficient to support the weight of the holder and electrode 58 therein and to urge the lower collar 56 against the lower surface of the carrier.

Figures 3, 5:
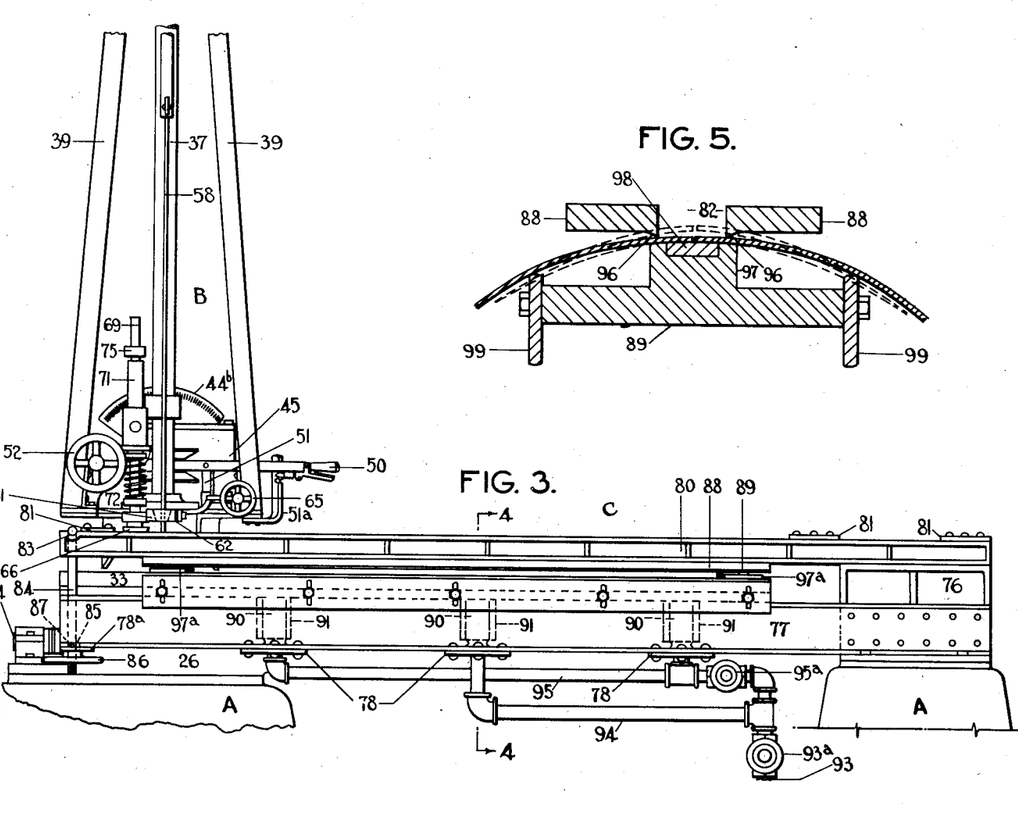
Fig. 3 is a side elevation of the work holder used for welding longitudinal seams and part of the electrode feeding mechanism.
Fig. 5 is a diagram illustrating in an exaggerated manner the form and operation of the work holding shoes of Figures 3 and 4.

An electrode guiding means is provided at the bottom of the column 37 and comprises a bracket 59 fixed to the table 31 and slidably supporting the holder 60 of the electrode guiding eye 61, which is electrically insulated from the holder, as indicated at 62 in Figure 3. Alternatively, the guiding eye may be formed of insulating material. A screw-threaded spindle 63 rotatably mounted in the bracket 59 and held against longitudinal movement has operative engagement with a lateral extension 64 of the eye holder 60 for the purpose of adjusting the position of the eye 61. The spindle is rotated by a hand wheel 65 located adjacent the feed control wheel 52.

Figure 1:
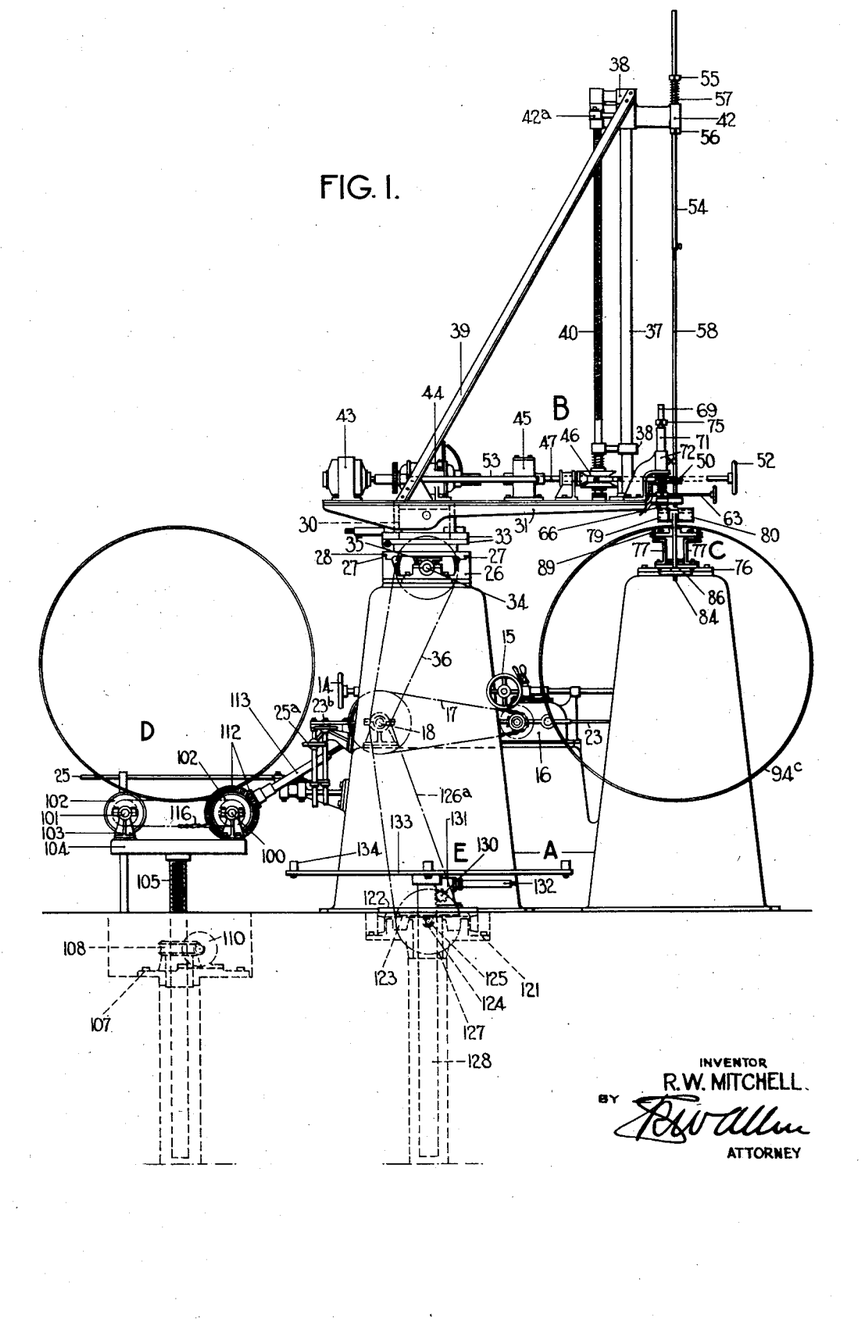
Fig. 1 is an end elevation of a machine constructed according to this invention equipped with work holders suitable for the welding of longitudinal, girth and head seams of tubular objects.

In order to ensure uniform ground resistance during the welding operation, a special grounding means is provided to engage the work holder C, or the work on holders D and E, as close as possible to the welding point, the said grounding means being moved with the electrode so as to be maintained at a constant lateral distance from the welding point. To accomplish the foregoing, a contact member, preferably a shoe 66, is arranged to be urged by a spring 67 against the work holder C or against work on the holders D or E, according to the positioning of the table 31, and has connected to it a grounding conductor 68 (Figures 1 and 6). The shoe 66 is preferably mounted on the lower end of a rod 69 by means of a ball and socket joint 70 affording limited oscillatory movement in all directions to the shoe. The rod 69 is slidably mounted in a sleeve 71 which is adjustable vertically in a bracket 72 fixed to the end portion of the table 31, locking means such as a set screw 73 being provided to secure the sleeve in any position to which it is adjusted in the bracket. The spring 67 is compressed between the lower end of the sleeve 71 and a collar 74 fixed to the rod a short distance above the ball and socket joint 70, so as to leave the shoe free to oscillate. A collar 75, adjustably secured to the rod 69 above the sleeve 71, holds the shoe, rod and spring against excessive depression when the shoe is out of engagement with a work holder or work. Because of the sleeve 71, the shoe may be vertically adjusted within a considerable range without varying the tension of the spring 67, but the tension may be varied by adjusting the collar 75 up or down on the rod. When the shoe is in operative contact with a work holder or with work, the rod 69 is forced upwardly to position the collar 75 slightly above the sleeve 71, so that the shoe is spring pressed against the holder or work. The bracket 72 may be rigid and rigidly mounted on the table, as shown in Figures 1 and 4, or may have capacity for adjustment to position the shoe according to the inclination of the table. One manner of securing the desired adjustment is by providing the bracket with an adjustably clamped joint, as shown at 72a, Figure 6.

*The stationary work holder C for straight seam welding*

The work holder C, best shown in Figures 1, 3 and 4, is essentially an arm rigidly mounted at one end and arranged parallel with the line of movement of the electrode carriage. The arm comprises spaced upper and lower portions between which the work may be inserted and means to clamp the work in place, the upper arm being provided with a slot for passage of the electrode.

A structure which has been found satisfactory comprises a strong foot member 76 bolted to the base A and having fixed to its opposite sides the adjacent end portions of a pair of parallel spaced channels 77 arranged back to back and having their lower flanges connected at intervals by tie plates 78 and at the outer end by a tie plate 78a. A pair of spaced parallel upper arm members 79 and 80 are provided in spaced parallel relation to and above the channels 77 and are fixed at adjacent ends to the top of the foot piece 76. These members are connected at the foot end and at the free end by tie plates 81 and provide between them a slot 82 for passage of the electrode 58. The members 79 and 80 are preferably V-shaped in cross-section and arranged with one flange horizontal and one inclined, as shown in Figure 4, so as to afford the operator a good view of the work and enable escape of fumes. The V-shape of the members 79 and 80 changes to channel shape at the end portions to provide upper flanges for attachment of the tie plates 81. The upper edge surface of the member 79 provides an engaging surface for the shoe 66.

At the free ends of the members 79 and 80, their upper surfaces are provided with transverse grooves 83 to receive the head of a large T-bolt 84, the shank of which extends downwardly through a notch 85 in the outer end tie plate 78a and carries a hand wheel 86 in screw-threaded engagement with the bolt. A cross-pin 87 passes through the bolt above the tie plate.

The lower flanges of the upper arm members 79 and 80 may be provided with work engaging shoes 88 fixed thereto and extending the length of the slot 82, but separable shoes may be dispensed with. A single complementary shoe 89 is mounted on the lower part of the arm and is vertically movable to press work against the upper shoes 88. The mechanism now preferred for moving the lower shoe 89 is pneumatic or hydraulic and comprises a series of three stationary pistons 90 fixed to the tie plates 78, between the channels 77, and a complementary series of movable cylinders 91 operatively engaging the pistons. The heads of the cylinders are connected to the shoe 89 by any suitable means such as nutted studs or bolts 92. A fluid supply pipe 93 having a two-way fluid supply and release valve 93a is provided with two branches 94 and 95, the former leading to the central cylinder and the latter to the two end cylinders. A valve 95a in the pipe 95 controls fluid flow independently of flow in the pipe 94.

Owing to the necessity of spacing the adjacent edges of the shoes 88 a material distance apart to prevent the arc striking from the electrode to the shoes instead of to the work, the edge portions of the plate or work W are unrestrained. When the work is a flat plate bent to cylindrical or other curved form, the edges tend to retain their original flat form, as shown in exaggerated degree in broken lines, Figure 5, instead of the desired cylindrical form shown in dotted lines. In order to overcome this tendency, the shoes 88 and 89 are formed to position and hold the edges of the plate slightly inward from the cylindrical form, as shown in full lines, during the welding operation. When the work is released from the shoes, the resiliency of the metal causes it to assume a true cylindrical curvature at the weld. To accomplish the desired holding of the plate edges, the lower surfaces of the shoes 88 are formed horizontal or may even be slightly lipped downward at their adjacent edges, as shown at 96 in Figure 5. The lower shoe 89 is formed with a central upstanding rib 97 having an inset copper strip 98 in its upper surface which is transversely convex. Work supporting strips 99 are mounted on the sides of the shoe 89 with capacity for vertical adjustment. In setting up the machine for welding a cylindrical object, the supports 99 are so adjusted that when the work is clamped between the upper and lower shoes the edges of the plate will be bent slightly inward from true cylindrical form and pressed tightly against the copper strip 98.

Chisel edged seam positioners 97a are slidably mounted on the rib 97 toward the ends thereof and are adapted to be engaged in the seam ends to hold the work in proper position while the holder is being closed upon it, the positioners being disengaged from the work during welding.

While the lower member of the work holding arm has been shown and described as built of structural sections and castings, it will be understood it and the foot 76 may be formed otherwise, for example, of a single casting. Similarly, while the upper portion of the arm has been shown as formed of castings, it is obvious it may be formed otherwise, for example of structural sections.

*The rotating work holder D for girth seam welding*

Figure 2:
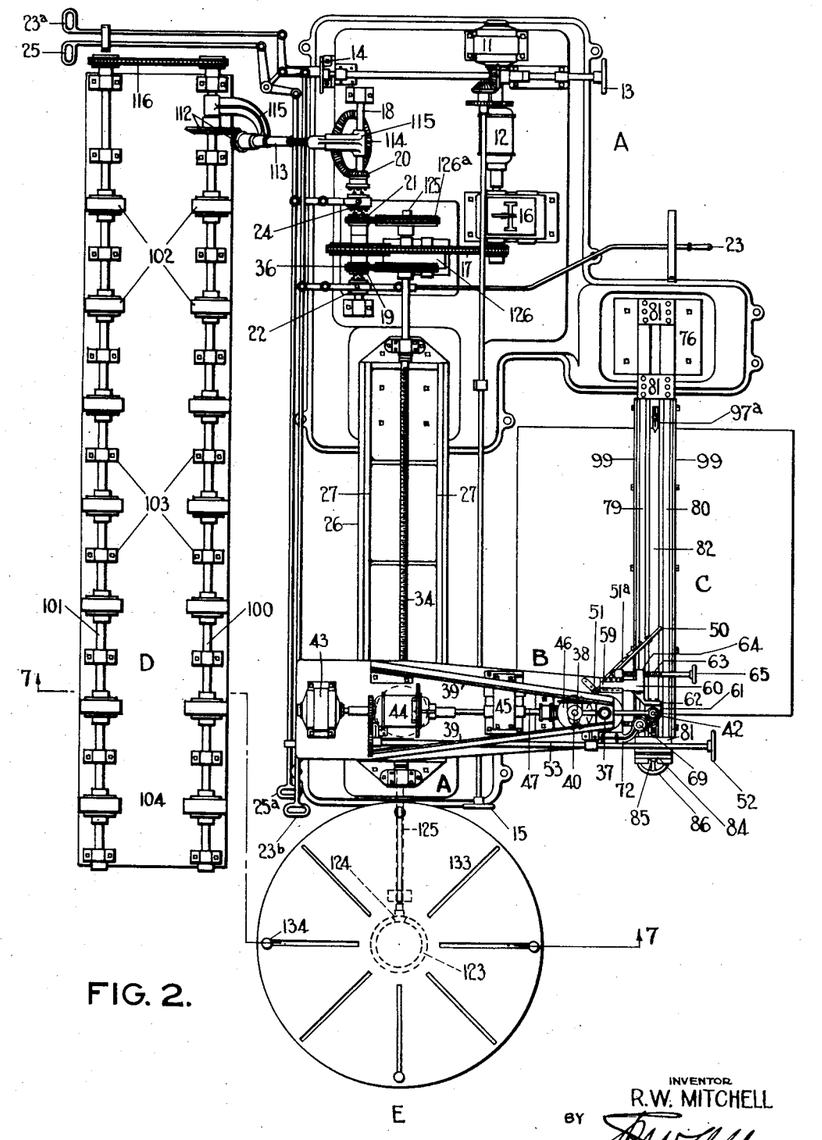
Fig. 2 is a plan view of the machine illustrated in Fig. 1.

The rotating work holder D is located at the opposite side of the electrode carrying means B from the stationary work holder C and arranged parallel to the line of travel of the electrode carriage, as clearly shown in Figure 2. The axial lines of the work holders C and D are approximately equidistant on opposite sides of the axial line of the bed 26, so that the table may be swung into operative relation with either holder and the carriage will move the electrode along the axial line of either holder. Preferably the axial line of the holder D is slightly nearer to or farther from the axial line of the bed 26 than is the axial line of the holder C, according to the direction of rotation of work on holder D, so that the electrode will follow a path slightly below the highest point of the work.

The work holder D comprises essentially a pair of parallel shafts 100 and 101 disposed equidistantly on opposite sides of the holder axis and having fixedly mounted thereon a series of rubber tired rollers 102, the shafts being so spaced that the rollers constitute a cradle in which cylindrical structures of different sizes may rest, as shown in Figure 1, and will be rotated upon rotation of the shafts. The work holder D, carrying the shafts 100 and 101, is vertically adjustable according to the size of the work, so as to position the welding point of the work at proper elevation with respect to the electrode carriage.

The shafts 100 and 101 are mounted in bearings 103 on a platform 104, which is in turn mounted on any suitable sort of elevating device. One such device is illustrated and comprises a pair of large screw-threaded posts 105 passing through nuts 106 rotatably supported in a bed plate 107 and adapted to be simultaneously rotated by worm gears 108 meshing with worms on a shaft 109 driven by a reversible motor 110. The bed 107 is preferably located below the floor level so that the platform can be lowered close to the floor to facilitate placing work thereon. When the platform is lowered, the elevating screws descend into wells 111 in the foundation.

The shaft 100 is connected through bevel gears 112 and a telescoping shaft 113 carrying a bevel gear 114 meshing with the bevel pinion 20 on the countershaft 18. The telescoping shaft is mounted in bearing yokes 115 mounted on the shafts 18 and 100, so that the telescoping shaft 113 adjusts itself automatically to the elevation of the platform and transmits the power of the main motor 11 to the shaft 100. Worm gearing may be used instead of the bevel gears. If desired, the shafts 100 and 101 may be connected together by chain gearing 116, but this may be omitted and the shaft 101 and rolls thereon allowed to idle.

Figure 10:
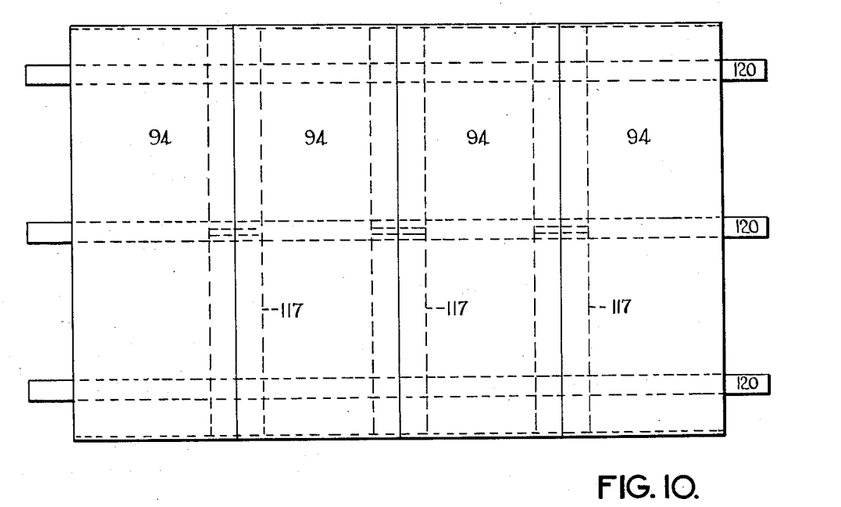
Fig. 10 is a plan view of a number of tubular elements temporarily secured in end abutting relation for welding the girth seams to connect the elements.

In order to hold two or more cylindrical work sections W in end abutting relation for welding of their ends together, internal expanding clamps (Figures 10 and 11) are used. Each clamp is essentially a split ring 117 provided with any suitable means for expanding it inside the work, for example, a cam 118 pivoted to one end of the ring and engaging the other end and adapted to be rotated by a handle 119, the cams being so profiled as to be self-locking. When three or more work sections are assembled for welding, as shown in Figure 10, it is preferable to pass stiff bars 120 through apertured lugs 121 on the inner surfaces of the rings to form a lifting means for the assembled work sections and prevent the assembly sagging in between the ends and disturbing the end abutting relation of the sections.

*The rotating work holder E for welding head seams*

This holder comprises essentially a vertically adjustable turntable so located that the electrode may be brought into operative relation with work on the turntable. A convenient location is at the end of the bed 26 carrying the electrode carriage, as shown in Figure 2, the holder preferably being so located that the electrode carriage extends over the work and the welding is done at a point remote from the mounting of the carriage. This arrangement is most convenient for the operator, as it gives him free access to the work at the welding point and, moreover, it enables the ground shoe to be engaged with the work without any lateral adjustment of the shoe.

A suitable form of mechanism comprises a bed casting 121 mounted preferably below floor level, and rotatably supporting a turntable 122, the lower side of which is provided with a bevel gear 123 engaged by a drive pinion 124 mounted on a shaft 125, which extends beneath the bed casting 26 and into proximity with the counter shaft 18 with which it has any suitable driving connection, such as speed reduction gearing comprising the speed reducer 126 and the chain gearing 126ª, including the pinion 21 on the counter shaft. The turntable 122 is provided with a central depending sleeve 127, in which a column 128 is vertically slidable. The column is formed with an inset rack 129, which extends longitudinally thereof, and is engaged by a pinion 130 mounted on the turntable and operated through a worm gear speed reducer 131 by a shaft 132, which extends to the periphery of the turntable and may be squared for the attachment of operating means such as a crank. If the column is cylindrical, it may be splined to the turntable 122 to hold the column against rotation independently of the turntable. A work holding platform 133 is mounted on the top of the column 128. Radially adjustable work centering and holding means 134 may be provided on the platform.

*Operation of the machine*

In the formation of an object such as a tank, the first welding operation is the longitudinal seam or seams. If the tank or pipe is of such length that it cannot be formed of a single plate, the necessary number of plates are bent to shape and the longitudinal seams thereof welded. The sections thus formed are clamped in end abutting relation and the girth or circumferential seams welded. Finally, the heads, if any, are welded in.

To weld a longitudinal seam, the plate is bent to desired shape, for example, the cylindrical form indicated in the drawings, and the abutting edges temporarily connected in any suitable way, for instance, by spot welding near the ends and at intermediate points if necessary. The work holder C is opened by loosening the hand wheel 86 and removing the bolt 84, the T-head of which lifts out of the grooves 83. The work 94 is slipped endwise into the space between the upper and lower shoes 88 and 89 with the edges to be welded centered between the upper shoes 88, by means of the holders 97ª engaged in the crack between the abutting plate edges. The bolt 84 is replaced and the hand wheel tightened until the tie plate 78ª is pressed against the cross pin 87 of the bolt, which prevents the upper and lower arms of the holder being drawn out of parallelism by excessive tightening of the wheel 86. Fluid pressure is admitted through the valve 93ᵃ and pipe 94 to the central cylinder 91, the valve 95ᵃ being closed, and raises the central cylinder 91 and the lower shoe 89, so that the same thrusts the work up against the upper shoes 88. The valve 95ᵃ is then opened to admit fluid pressure through the pipe 95 to the end cylinders and the pressure in all three cylinders clamps the work securely in place. The holders 97ᵃ are retracted and a small piece of scrap steel placed against the end of the work where the weld is to start. Assuming that the variable and selective speed gears 12 and 16 are properly adjusted for the work in hand and that electric power is turned on, the operator throws in the clutch 22 by means of the control 23, so that power is transmitted to the worm shaft 34 which causes the electrode carriage to move along the bed 26.

When the electrode is above the aforesaid piece of scrap steel, assuming the end of the electrode to be at proper welding distance above the scrap (as it would be left on completion of a previous weld or on the insertion of a fresh electrode), the operator grasps the electrode holder 54 and pulls it down against the spring 57 until the electrode touches the scrap and the arc strikes to the scrap, thus avoiding any burning of the work at the start. The holder is then released and the spring 57 raises the holder and electrode above the work to draw an arc of proper length, the upward movement being determined by the position of the adjustable stop 56 on the electrode holder. At the same instant, the operator throws in the clutch 46 by means of the handle 50, so that power is transmitted from the motor 43 on the carriage to the electrode feeding screw 40, which causes the electrode to descend slowly. As the welding proceeds, the operator effects any small adjustments of the feeding speed by means of the hand wheel 52 controlling the variable speed device 44, so as to maintain the length of arc constant. The lateral position of the electrode may be adjusted by means of the handle 65 controlling the position of the electrode guiding eye 61, so as to compensate any irregularity of the seam or any wandering of the arc or any slight misalignment of the seam between the shoes 88. Owing to the surface inclination of the upper work holding arm members 79 and 80 (Figure 4), the welding may be easily watched and the fumes will escape freely. The welding current is grounded through the spring pressed shoe 66 engaging the work holder arm 79. As this shoe is carried by and moves with the electrode carriage, it maintains a constant relation to the electrode and, in consequence, the resistance is constant from end to end of the seam and stability of the arc is assured, so that the characteristics of the weld are uniform. Movement of the ground shoe with the electrode substantially eliminates wandering of the arc. When the weld is finished, the operator unclutches the electrode feed screw 40 and the carriage feed screw 34, releases the fluid in the cylinders of the work holder by means of the valve 93ᵃ, opens the holder and removes the work. The starting scrap is knocked off the end of the weld. For the next welding operation, the direction of carriage movement may be reversed so as to avoid loss of time in running the carriage back to the starting point between welding operations.

The lever 50 serves also to reverse the direction of rotation of the feed screw 40, when it is necessary to raise the electrode, by lifting the lower flange of the clutch member 46 into engagement with the driving member 49. In order to avoid loss of time in raising the electrode carrier 42 when a fresh electrode is to be inserted, the driving nut 42ᵃ may be unlatched and disengaged from the screw by means of the handle 42ᶜ and the carrier slid to the top of the screw and the nut re-meshed with the screw.

Figure 11:
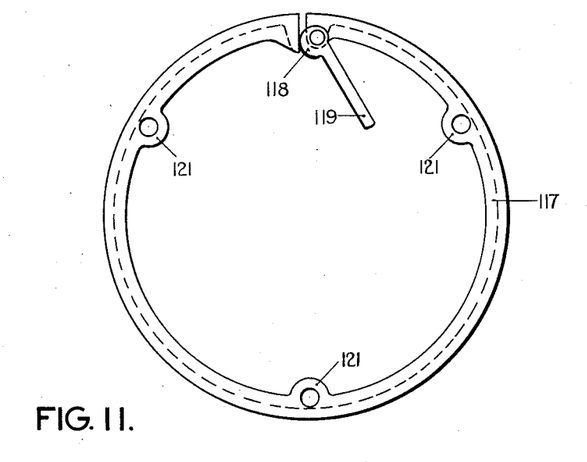
Fig. 11 is a plan view of a clamp for holding tubular elements in end abutting relation during welding.

As many work sections W as necessary are welded in the manner previously described and these sections are then assembled in end abutting relation, as shown in Figure 10, and clamped together by means of internal expanding clamps of any suitable sort, for example, those shown in Figure 11. If more than two sections are to be welded together, it is desirable to pass reinforcing bars 120 through the clamps to prevent the proper relation of the work sections being disturbed in handling the assembly.

Figure 8:
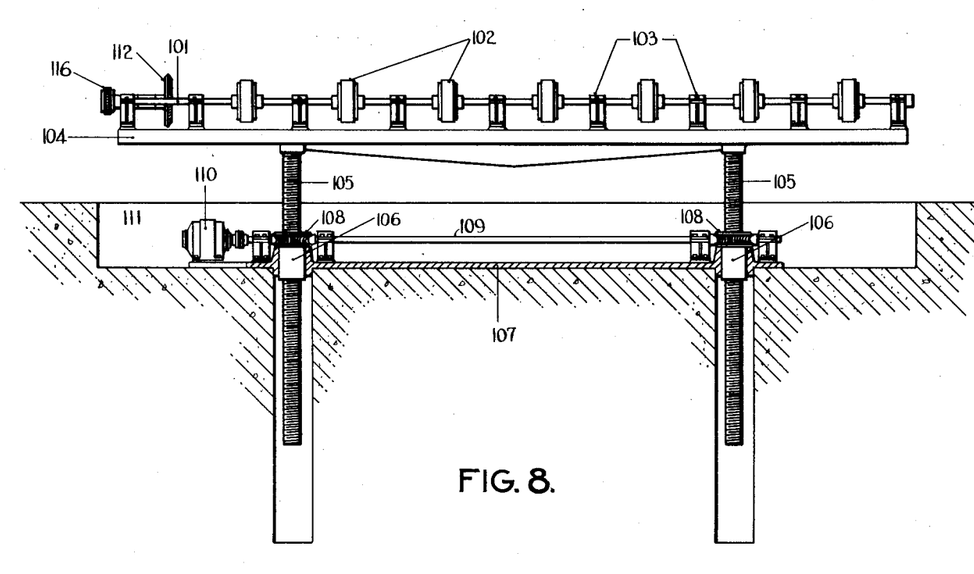
Fig. 8 is a side elevation, partly in vertical section, of the work holder for girth seam welding.

The assembled work sections are placed on the work holder D, which is vertically adjusted as necessary, by the elevating gear best shown in Figure 8, to position the top of the work at the same level as it occupied on the holder C. The turret 29 is unlocked from the base 28 and the table 31 swung through 180°, so that the electrode stands above the work on the holder and preferably slightly to one side of the axial line of the holder. The operator then throws the clutch member 24 into mesh with the corresponding member on the pinion 20, by means of the handle 25, so that power is transmitted from the motor 11 to the shaft 100 to rotate same. The work resting on the rubber treaded rolls 102 on the shaft 100 and the companion shaft 101 is thus rotated about its axis. The operator causes the electrode carriage to move along the bed 26, as described in connection with welding longitudinal seams, until the electrode registers with the first pair of abutting ends to be welded, and then stops the carriage travel, using the control handle 23ᵃ. The ground shoe 66 is lowered into contact with the work itself by loosening the set screw 73 (Fig. 6) and suitably pressing down the sleeve 71 and then tightening the screw. The girth seam is welded in the same way as the longitudinal seam, excepting that no starting scrap is used and the work moves under the stationary carriage. When one girth seam is welded, the electrode carriage is moved along the bed 26 to the next seam, and so on.

It is obvious that by multiplying the number of electrodes and feeding means therefor, with provision for adjusting the means toward and away from one another, a plurality of girth seams may be welded simultaneously and irrespective of their spacing.

Figure 7:
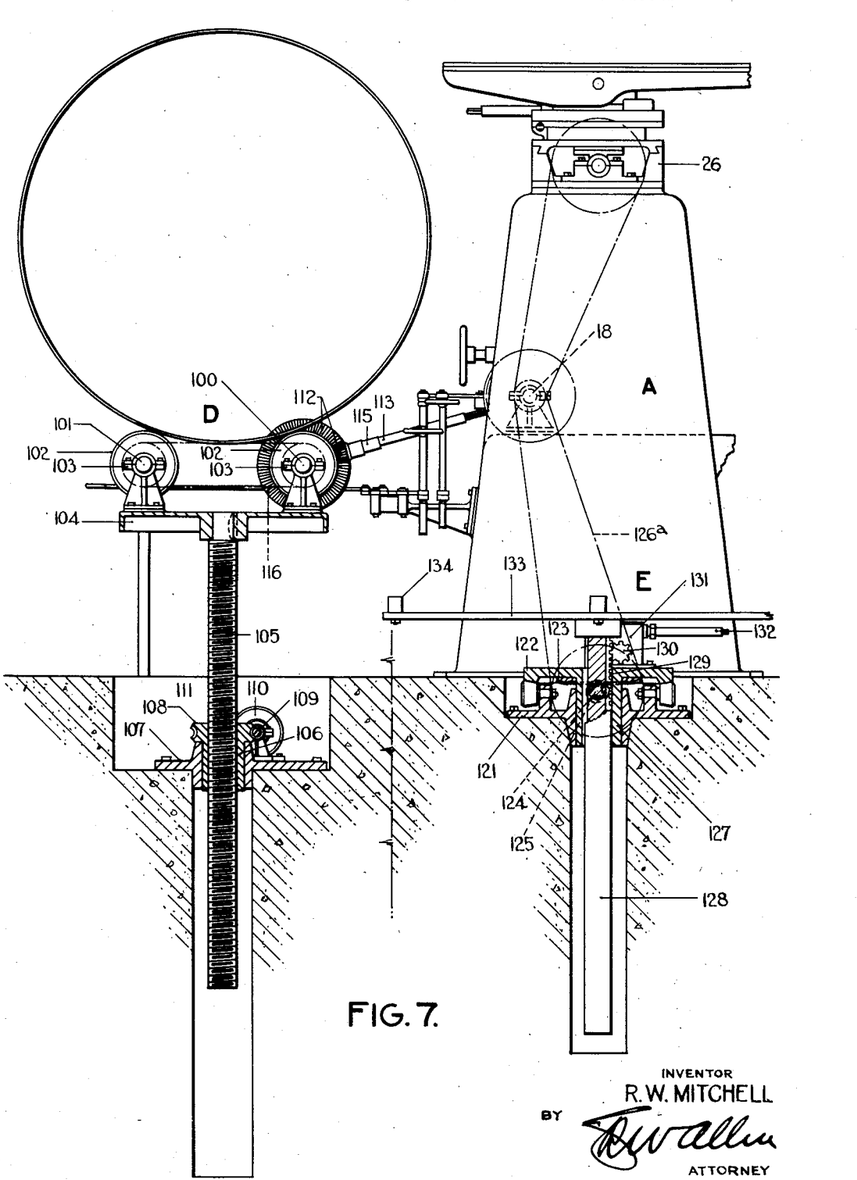
Fig. 7 is an elevation partly in vertical section on the line 7—7 of Figure 2, and illustrates the construction of the work holders for head and girth seam welding.

When the girth seams are all welded, the work is taken off the holder D and the internal clamps removed. If the structure is to be a tank, the heads are pressed in and the work is set axially vertical on the turntable 133 of work holder E and centered thereon and clamped by the means 134. The turntable is vertically adjusted as necessary, by means of the rack and pinion mechanism (Fig. 7) operated by a crank on the drive shaft 132, until the seam to be welded is at the same elevation as in previous operations. The turret of the electrode carriage is unlocked and the table 31 swung into proper position over the work, the electrode carriage being moved along the bed as may be necessary.

The positioning of the carriage over the work is necessary merely because the ground shoe 66 is located between the electrode and the pivotal centre of the turret, and the table therefore must project over the work to enable the ground shoe to engage the work. Obviously, if the bracket 72 is dimensioned to locate the ground shoe outwardly of the electrode, the welding point in head welding may be at that side of the work nearest the bed 26. This will have the advantage of permitting articles of larger diameter to be welded, but will have the disadvantage that the welding point is less readily accessible for observation of the welding as it proceeds.

To start head welding, the operator engages clutch member 24 with the sprocket member 21, so that power is transmitted from the motor 11 through the chain gearing 126a to the shaft 125 extending beneath the bed to the rotating mechanism of the turntable (Figs. 1, 2 and 7) to rotate same, the clutch being operated by handle 25a. The actual welding is as previously described.

In any of the welding operations previously described, the operator may reguate the speed of relative movement of the work and electrode by means of the variable speed device 12 and the control handles 13, 14, 15 therefor located conveniently to the different work holders (see Fig. 2). The normal speed of relative movement of the electrode and work may also be varied from time to time by means of the selective speed change device 16, for example, when there is a substantial change in the thickness of plates to be welded.

From the foregoing, it will be evident I have provided a machine capable of universal adaption and of welding the three basic types of seams. By operating the different feeds simultaneously, the machine will weld helical, spiral, elliptical or irregularly shaped seams. For example, by causing the electrode carriage to travel while welding work on the holder D, a helical weld may be made and this capability enables pipe elbows and branches to be welded by turning the work over and reversing the direction of carriage movement when one half of the weld has been made. Other irregular girth welds may be made by regulating the relative speed of work holders and electrode carriage. Similarly, regular non-circular and irregular welds lying in a single plane may be made by moving the electrode carriage relatively to work on the rotating holder E. If desired, instead of adjusting the height of the work holders D and E, the carriage may be tilted by means of the worm gearing 29b, 29c.

While the machine is peculiarly adapted for the manufacture of pipes, tanks and barrels, it will be understood it may be used in the manufacture of many other things by the adaptation of the work holders to the special work. The shoes of the work holder C are easily removable, so that shoes of shape suitable to the work may be easily and quickly inserted. In any type or shape of weld, the distance between the electrode and the ground shoe is constant, so that the characteristics of the weld are constant. The ball and socket mounting of the ground shoe enables the shoe to adjust itself to the surface of the work so as to maintain a sufficient contact area.

While the machine has been heretofore described as an electric arc welding machine, it will be understood the invention is not limited to electric welding, as an oxy-acetylene or other gas torch may be mounted on the carriage and the electrode feeding means may be used to feed a rod of spelter or other brazing material if desired. In such use, the operation of the work holders and the carriage will be unchanged. The ground shoe will, of course, be dispensed with in gas welding. The machine may also be used for gas-electric welding.

Having thus described my invention, what I claim is:—

1. In a welding machine, in combination, electrode carrying means, and a plurality of work holders located about said electrode carrying means, each of said work holders being adapted to hold work suitably for welding a different type of seam thereon, said electrode carrying means being movable from one to another of said work holders, a motor and selective driving connection between said motor and certain of said work holders and between said motor and said electrode carrying means whereby the movements of the electrode carrying means and of a work holder may be variously co-ordinated to produce a variety of welds.

2. In a welding machine, in combination, electrode carrying means, a plurality of work holders located about said electrode carrying means, said electrode carrying means being movable from one to another of said work holders, electrode feeding means, a motor and selective driving connection between said motor and certain of said work holders and between said motor and said electrode carrying means adapted to cause additional relative movement of the electrode and work on each of said work holders separately, whereby the electrode will in effect traverse the surface of the work.

3. In a welding machine, in combination, a pivotally mounted electrode carrying means, a plurality of work holders located about said electrode carrying means, means to move said carrying means bodily, and independently of its pivotal movement, relatively to said work holders, and to actuate certain of said work holders to move work thereon relatively to an electrode on said carrying means, said means comprising a motor and selective driving connection between said motor and certain of said work holders and between said motor and said electrode carrying means whereby the movements of the electrode carrying means and of a work holder may be variously co-ordinated to produce a variety of welds.

4. In a welding machine for making hollow bodies, in combination, a work holder adapted to hold work stationary for welding a longitudinal seam of a tubular body, a second work holder adapted to support the tubular body axially horizontal and to rotate the same about its horizontal axis for welding a girth seam thereof, a third work holder adapted to support the tubular body axially vertical and to rotate the same about its vertical axis for welding in an end, and a pivotally mounted electrode carrying means movable into operative relation with said work holders selectively, a motor and selective driving connection between said motor and certain of said work holders and between said motor and said electrode carrying means adapted to move said electrode carrying means bodily relatively to said holders and independently of its movement about its pivotal axis, whereby the movements of the electrode carrying means and of a work holder may be variously co-ordinated to produce a variety of welds.

5. In a welding machine for making hollow bodies, in combination, a work holder adapted to hold work stationary for welding a longitudinal seam of a tubular body, a second work holder adapted to support the tubular body axially horizontal and to rotate the same about its horizontal axis for welding a girth seam thereof, a pivotally mounted electrode carrying means movable into operative relation with said work holders selectively, a motor and selective driving connection between said motor and certain of said work holders and between said motor and said electrode carrying means adapted to move said electrode carrying means bodily relatively to said holders and independently of its movement about its pivotal axis, whereby the movements of the electrode carrying means and of a work holder may be variously co-ordinated to produce a variety of welds.

6. In a welding machine for making hollow bodies, in combination, a work holder adapted to hold work stationary for welding a longitudinal seam of a tubular body, a second work holder adapted to support the tubular body axially vertical and to rotate the same about its vertical axis for welding in an end, a pivotally mounted electrode carrying means movable into operative relation with said work holders selectively, a motor and selective driving connection between said motor and certain of said work holders and between said motor and said electrode carrying means adapted to move said electrode carrying means bodily relatively to said holders and independently of its movement about its pivotal axis, whereby the movements of the electrode carrying means and of a work holder may be variously co-ordinated to produce a variety of welds.

7. In a welding machine for making hollow bodies, in combination, a work holder adapted to support a tubular body axially horizontal and to rotate the same about its horizontal axis for welding a girth seam thereof, a second work holder adapted to support the tubular body axially vertical and to rotate the same about its vertical axis for welding in an end, a pivotally mounted electrode carrying means movable into operative relation with said work holders selectively, and means to move said electrode carrying means bodily relatively to said holders and independently of its movement about its pivotal axis and to selectively operate said work holders whereby the movements of the work and of the electrode may be variously co-ordinated to produce a variety of welds.

8. In a welding machine, in combination, a bed, a slide thereon, an electrode carrying means pivotally mounted on said slide, work holders on opposite sides of and substantially parallel with said bed and a third work holder at one end of said bed, said electrode carrying means being pivotally movable into operative relation with said holders selectively, and slidable along the bed thereby to position said electrode carrying means in operative relation with different parts of said work holders, a motor and selective driving connection between said motor and certain of said work holders and between said motor and said electrode carrying means whereby the movements of the electrode carrying means and of a work holder may be variously co-ordinated to produce a variety of welds.

9. In a welding machine, in combination, a bed, a slide thereon, a turret on said slide rotatable about a vertical axis, an electrode carrying means pivotally mounted on said turret for rotation relatively thereto about a horizontal axis, said carrying means being rotatable with the turret about a vertical axis.

10. In a welding machine, in combination, a bed, a slide thereon, work clamping jaws located at one side of said bed, and parallel thereto, a vertically adjustable platform at the opposite side of said bed, a pair of revoluble work supporting rolls on said platform arranged axially parallel with said bed, a vertically adjustable work supporting platform at the end of said bed, an electrode carrying means pivotally mounted on said slide and adapted to swing into operative relation with said three work supports selectively, a motor, speed changing means connected to the motor, selectively operable driving connections between said speed changing means and said slide, said work supporting rolls and said second platform to independently move the slide along the bed, revolve said work supporting rolls and rotate said second platform, whereby the movements of the work and of the electrode may be variously co-ordinated to produce different welds.

11. In a welding machine, in combination, a bed, an electrode carrying means mounted on said bed comprising a table, upright guiding means on the table, an electrode carrier slidable on said guiding means, means to move said electrode carrier to feed an electrode toward the work, manual control means for said carrier moving means located adjacent the work, and means to move the table along the bed whereby an electrode in the carrier will be caused to move lengthwise of said work.

12. In a welding machine, in combination, a bed, an electrode carrying means mounted on said bed comprising a table, upright guiding means on the table, an electrode carrier slidable on said guiding means, a feed screw operatively engaging said electrode carrier, a motor on the table, driving connection between said motor and said feed screw including a variable speed device and a reversible clutch means, manual controls for said variable speed device and said clutch means located adjacent the work, and means to move the table along the bed whereby an electrode in the carrier will be caused to move lengthwise of said work.

13. In a welding machine, in combination, a bed, an electrode carrying means mounted on said bed comprising a table, upright guiding means on the table, an electrode carrier slidable on said guiding means, means to move said electrode carrier to feed an electrode toward the work, an electrode holder slidable in said electrode carrier and adapted to be moved to engage an electrode therein with the work whereby an arc may strike between the electrode and work, means to urge the electrode holder and electrode therein away from the work thereby to draw an arc out to working length and adjustable means to limit movement of the electrode holder and electrode therein away from the work, manual control means for said carrier moving means located adjacent the work, and means to move the table along the bed whereby an electrode in the carrier will be caused to move lengthwise of said work.

14. In a welding machine, in combination, an electrode carrier, an electrode holder slidable in said electrode carrier and adapted to be moved to engage an electrode therein with the work whereby an arc may strike between the electrode and the work, means to urge the electrode holder and electrode therein away from the work thereby to draw an arc out to working length, and adjustable means to limit movement of the electrode holder and electrode therein away from the work.

15. In a welding machine, in combination, an electrode carrying means including a table, electrode feeding means on said table, a ground shoe carried by said table, means to urge said ground shoe toward the work, and means to adjust the position of said ground shoe relatively to said table.

16. In a welding machine, in combination, an electrode carrying means including an electrode feeding means, a ground shoe carried by said electrode carrying means, and means to adjust said ground shoe relatively to said electrode carrying means to selectively engage a work holder and work in a work holder, said ground shoe being maintained in fixed relation to the welding point in each such adjustment.

17. In a welding machine, in combination, an electrode carrying means including a table, electrode feeding means on said table, a bracket fixed to the table, a rod slidable in said bracket, a ground shoe on said rod, means to urge said rod and shoe toward the work and stop means to limit movement of said rod and shoe by said urging means.

18. In a welding machine, in combination, an electrode carrying means including a table, electrode feeding means on said table, a bracket carried by the table, a sleeve adjustably mounted in said bracket, a rod slidable in said sleeve, a ground shoe at one end of said rod, a collar adjustable on said rod adjacent the shoe, a spring in compression between said collar and the adjacent end of the sleeve, and a collar adjustable on said rod adjacent the end thereof remote from the shoe and adapted to engage said sleeve to limit movement of the rod and shoe under influence of said spring.

19. In a welding machine, in combination, electrode carrying means, a ground shoe, a mounting for said ground shoe carried by the electrode carrying means and a universal joint connection between said ground shoe and its mounting whereby said shoe may adjust itself to an engaged surface, and means to urge the shoe against an engaged surface.

20. In a welding machine, in combination, a bed, a pair of work supporting rollers at one side of said bed and parallel therewith, a slide on said bed, a turret on the slide rotatable about a vertical axis, a table connected at one end to said turret and adapted to extend laterally of the bed into operative relation with work on said rollers, a feed screw operatively engaging said slide, a motor, driving connections between said motor and said feed screw and one of said work supporting rollers including a variable speed device, a selective speed and reversing device, and a selective clutch means whereby said slide and said work supporting rollers may be selectively driven separately and collectively, and an electrode carrying device on said table including electrode feeding means.

21. In a welding machine, in combination, a bed, a platform at one side of the bed, a pair of work supporting rollers rotatably mounted on said platform in parallelism with said bed, means to vertically adjust said platform, a slide on said bed, a turret on the slide rotatable about a vertical axis, a table connected at one end to said turret and adapted to extend laterally of the bed into operative relation with work on said rollers, a feed screw operatively engaging said slide, a motor, driving connections between said motor and said feed screw and one of said work supporting rollers including a variable speed device, a selective speed and reversing device, and a selective clutch means whereby said slide and said work supporting rollers may be selectively driven separately and collectively, said driving connection to said driven work supporting roller including self-adjusting means to accommodate the driving to vertical adjustment of the platform, and an electrode carrying device on said table including electrode feeding means.

22. In a welding machine, in combination, a bed, a pair of work supporting rollers at one side of said bed and parallel therewith, a slide on said bed, a turret on the slide rotatable about a vertical axis, a table connected at one end to said turret and adapted to extend laterally of the bed into operative relation with work on said rollers, an electrode carrying device on said table adapted upon rotation of the turret and table to position an electrode therein selectively in operative relation with work on said rollers, a feed screw operatively engaging said slide, a motor, driving connections between said motor and said feed screw and one of said work supporting rollers including a variable speed device, a selective speed and reversing device, and a selective clutch means, whereby said slide and said work supporting rollers may be selectively driven separately and collectively, and the movements of the work and of the electrode variously coordinated to produce different welds.

23. In a welding machine, in combination, a bed, a pair of work supporting rollers at one side of said bed and parallel therewith, a slide on said bed, a turret on the slide rotatable about a vertical axis, a table connected at one end to said turret and adapted to extend laterally of the bed into operative relation with work on said rollers, an electrode carrying device on said table including a vertical guide, an electrode carrier slidable thereon, a feed screw for said carrier, a motor, driving connection between the motor and feed screw including a variable speed device and reversible clutch means, said electrode carrying device being adapted upon rotation of the turret and table to position an electrode therein selectively in operative relation with work on said rollers, a ground shoe carried by said table and engageable with work on said rollers, a feed screw operatively engaging said slide, a motor, driving connections between said motor and said feed screw and one of said work supporting rollers including a variable speed device, a selective speed and reversing device, and a selective clutch means, whereby said slide and said work supporting rollers may be selectively driven separately and collectively, and the movements of the work and of the electrode variously co-ordinated to produce different welds.

ROBERT W. MITCHELL.